United States Patent Office 3,640,985
Patented Feb. 8, 1972

3,640,985
POLYMERIZATION OF FLUORINE-CONTAINING ETHYLENICALLY UNSATURATED MONOMERS IN THE PRESENCE OF A BETA-HYDROXY-ALKYL TERTIARY-BUTYL PEROXIDE
Henry C. Stevens, Akron, Ohio, assignor to PPG Industries, Inc., Pittsburgh, Pa.
No Drawing. Filed May 16, 1969, Ser. No. 825,424
Int. Cl. C08f 3/22
U.S. Cl. 260—92.1                    5 Claims

ABSTRACT OF THE DISCLOSURE

Fluorine-containing ethylenically unsaturated monomers, e.g., vinylidene fluoride, are polymerized in an aqueous medium with an initiating amount of beta-hydroxyalkyl tertiary butyl peroxide.

BACKGROUND OF THE INVENTION

The use of peroxy compounds as a source of free radicals for the polymerization of fluorine-containing ethylenically unsaturated monomers is known. The choice of a particular peroxy compound for a particular polymerization depends on such things as the compound's solubility in the polymerization medium, its half-life at the temperature of polymerization and the properties of the polymer produced by its use. In the aqueous polymerization of fluorine-containing ethylenically unsaturated compounds, such as vinylidene fluoride, the properties of the polymer produced are particularly sensitive to the initiator used.

Free-radical initiators such as the persulfates, ditertiary butyl peroxide and disuccinic acid peroxide have been described as useful for the polymerization of vinylidene fluoride and like monomers; however, their utility as polymerization intiators for such materials has not been completely satisfactory. For example, the polymerization of vinylidene fluoride with a persulfate initiator, such as potassium or ammonium persulfate, yields polyvinylidene fluoride with relatively poor thermal stability. See, for example, U.S. Patent 3,193,539 and U.S. Patent 3,245,971. Ditertiary butyl peroxide has also been found to be unacceptable as a polymerization initiator for vinylidene fluoride because of the production of polymer in the form of lumps rather than as fine particles. See, for example, U.S. Patent 3,245,971. Similarly, the use of disuccinic acid peroxide as a polymerization initiator for vinylidene fluoride produces a product which has a molecular weight that is too high for use in such principal application areas as coatings and paints. There is, therefore, a continuing need for peroxy compounds suitable as initiators for fluoro-substituted olefins susceptible to free-radical polymerization, such as vinylidene fluoride, in an aqueous polymerization medium.

SUMMARY OF THE INVENTION

It has now been discovered that beta-hydroxyalkyl tertiary butyl peroxides are especially useful as polymerization initiators for fluorine-containing ethylenically unsaturated monomers, such as vinylidene fluoride. Of particular utility are the aforesaid peroxidic compounds wherein the alkyl group contains from 2 to 4 carbon atoms.

DETAILED DESCRIPTION

The polymerization of fluorine-containing ethylenically unsaturated monomers produces polymers which have been found useful in such areas as coatings and paints. For best results, the polymer should be white, of suitable molecular weight and particle size. For example, in the case of polyvinylidene fluoride, Gardner-Holdt viscosities will range from about 10 to about 200 seconds and the particle size will vary from about 0.1 to about 1.0 micron, preferably from about 0.3 to 0.6 micron. As discussed hereinabove, neither the inorganic peroxy compounds, such as the persulfates, nor the organic peroxy compounds, such as dietertiary butyl peroxide and disuccinic acid peroxide, have been found completely satisfactory as polymerization initiators for the aforementioned polymerization.

It has now been discovered that beta-hydroxyalkyl tertiary butyl peroxides are especially useful as polymerization initiators for fluorine-containing ethylenically unsaturated monomers, such as vinylidene fluoride; and, that their use produces a polymer of suitable molecular weight, color and particle size. In particular, it has been discovered that particularly useful results are obtained when the alkyl grouping contains from 2 to 4 carbon atoms, .i.e., beta-hydroxyethyl tertiary butyl peroxide, beta-hydroxypropyl tertiary butyl peroxide, and beta-hydroxybutyl tertiary butyl peroxide.

The amount of beta-hydroxyalkyl tertiary butyl peroxide used in conducting the polymerization of the fluorine-containing ethylenically unsaturated compounds described herein that amount required to initiate the polymerization, i.e., an initiating amount. Typically, between about 0.02 and about 1.0 weight percent of the beta-hydroxyalkyl tertiary butyl peroxide, based on the weight of fluorine-containing ethylenically unsaturated compound charged to the polymerization vessel is employed. However, greater or lesser amounts than the next preceding amounts can be used if such is required by the particular polymerization conditions desired.

Polymerization temperatures will vary and will usually depend on the polymerization rate desired. Typically, polymerization temperatures will range between about 50° C. and about 130° C., and usually will range between about 80° C. and about 110° C. Temperatures below 50° C. can be employed; however, at such temperatures, the polymerization rate is slow. Similarly, at temperatures above 130° C., the polymerization rate is very rapid and requires special efforts to remove the heat dissipated by the polymerization reaction. In addition, at such high temperatures, vapor phase polymerization occurs and such polymerization yields a nonhomogeneous polymer product. Thus, although temperatures above 130° C. can be employed, such temperatures are usually avoided in order to eliminate these additional problems.

Polymerization pressures will vary also and will depend mostly on the temperature of polymerization. Thus polymerization pressures can be at atmospheric, autogeneous or superatmospheric pressures.

Vinylidene fluoride polymerization pressures are usually superatmospheric, e.g., at least about 200 pounds per square inch gage. At pressures below 200 p.s.i.g., polymerization rates are slow. There is no critical upper limit to the polymerization pressure. For example, pressures as high as 20,000 p.s.i.g. and more can be employed, if desired. Typically, the upper pressure limit is determined by the design limits of the equipment used for the polymerization. Therefore, polymerization pressures will range typically from about 200 p.s.i.g. to 3,000 p.s.i.g. and usually will range from about 300 p.s.i.g. to 1,200 p.s.i.g.

An aqueous polymerization media is conveniently used with beta-hydroxyalkyl tertiary butyl peroxides for the reason that the compound is sufficiently water soluble. In suspension type polymerizations, where it is usually desired that the initiator be soluble in the monomer polymerized, the initiators described herein also can be used conveniently. The water used as the polymerization medium is preferably deoxygenated and/or deionized. The amount of water used can vary over a relatively wide range. Typically, the weight ratio of water to the fluorine-containing monomer ranges from about 2:1 to about 40:1 and usually ranges from about 3:1 to about 20:1.

When it is desired to obtain a polymer as a dispersion or latex which can be coagulated to form an easily handled, free-flowing powder, a surfactant is used. The concentration of the surfactant is not critical and the amount of surfactant used depends on the polymer particle size desired, i.e., the smaller the particle desired, the larger the quantity of surfactant required. Typically, the surfactant or dispersant is used in amounts that range from about 0.05 to about 5 weight percent based on the polymerization medium, e.g., water. Usually from about 0.05 to about 2 weight percent surfactant is used. It is preferred that the surfactant be compatible with the fluorinated polymer produced.

A particularly suitable class of surfactants for use with fluorine-containing unsaturated monomers are the highly fluorinated or highly fluorochlorinated group of surfacttants having from 6 to about 20 carbon atoms and preferably from about 7 to about 15 carbon atoms. Examples of such surfactants are the perfluorocarboxylic acids or their water soluble salts, such as hydroperfluoroheptanoic acid, perfluorooctanoic acid, perfluorononanoic acid, or perfluorodecanoic acid and the alkali metal or ammonium salts thereof. Other types of surfactants include: "Chlorendic acid," a hexachloroendomethylene tetrahydrophthalic acid, and tetrachlorophthalic acid. In the polymerization of fluorine-containing monomers, it is desirable to use a small amount of an ammonium salt of a fluoro acid even when other surfactants are used. Surfactants of the aforementioned type are well known in the art and have been adequately described therein. See, for example, U.S. Pats. 3,193,539 and 3,245,971 and British Pat. 861,-951.

In carrying out the polymerizations described herein, any charging sequence to the polymerization reactor can be used. A convenient sequence, especially in connection with gaseous fluorine-containing monomers, comprises charging water to the reactor together with the surfactant and initiator. Thereafter, the air space in the reactor is evacuated or swept out with an inert gas, the monomer charged to the reactor under pressure, and the reactor heated or cooled to polymerization temperatures. Polymerizations can be carried out either as a batch operation or as a continuous operation. In the latter operation, the reactor is connected to a source of monomer under pressure such that fresh monomer charged enters the reactor as conversion to polymer occurs. Typically, for a continuous run, sufficient water, initiator and surfactant for the entire polymerization run, is charged to the reactor at the start of the run; however, one or more of these materials can be charged continuously or semi-continuously to the reactor as the run proceeds.

During polymerization, the reactor contents are preferably well agitated, such as by an internal agitator or by shaking or rocking the reactor. Such agitation enhances the entrainment of the monomer in the polymerization medium.

At the completion of the polymerization, the pressure on the reactor is released and an aqueous suspension of polymer withdrawn. The polymer is recovered by centrifugation or by flocculating the polymer and recovering it by conventional techniques, such as by filtration. The filtrate obtained after removal of the polymer from its aqueous suspension can be recirculated to the polymerization vessel in view of its residual surfactant and initiator content. The polymer is then dried, ground and fluid energy milled to produce a free-flowing powder. In the case of polyvinylidene fluoride, drying is conveniently conducted at less than about 100° C. in a vacuum oven.

Fluorine-containing ethylenically unsaturated compounds polymerizable with the beta-hydroxyalkyl tertiary butyl peroxides of the present invention typically contain from 2 to 4 carbon atoms. Other halogens, e.g., chlorine and bromine, can also be present in the polymerizable compound. Examples thereof include: vinyl fluoride, vinylidene fluoride, chlorotrifluoroethylene, tetrafluoroethylene, trifluoroethylene, 1,1-difluoro-2,2-dichloroethylene, perfluoropropylene, 3,3,3 - trifluoropropylene and 3,4-dichloroperfluorobutene-1. The conditions of polymerization will, of course, vary with the particular compound polymerized. Such conditions are well known in the prior art. Copolymers of a mixture of two or more of the aforementioned fluorine-containing ethylenically unsaturated compounds or of a mixture of one or more of said fluoroethylenes with one or more monomers susceptible to free-radical polymerization can also be prepared with the aforementioned initiators.

The beta-hydroxyalkyl tertiary butyl peroxides of the present invention can be depicted by the general formula:

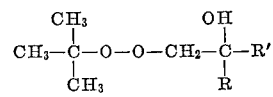

wherein R is selected from the group consisting of hydrogen and methyl, and R' is selected from the group consisting of hydrogen, methyl and ethyl. Exemplary of the compounds falling within the scope of the aforesaid general formula are: beta-hydroxyethyl tertiary butyl peroxide, beta-hydroxypropyl tertiary butyl peroxide, beta-hydroxybutyl tertiary butyl peroxide, and beta-hydroxyisobutyl tertiary butyl peroxide.

The beta-hydroxyalkyl tertiary butyl peroxides of the present process can be prepared by condensing an epoxy alkane, e.g., ethylene oxide, propylene oxide, 1,2-epoxy butane and isobutylene oxide, with tertiary butyl hydroperoxide. The formation of the beta-hydroxyalkyl tertiary butyl peroxide product is facilitated by the use of a basic catalyst, e.g., potassium hydroxide. Preparation of the aforementioned peroxidic compounds is suitably described in U.S. Pat. 2,605,291.

Utility to which the polymers prepared in accordance with the process described herein can be put depends on the particular polymer prepared. All of the fluorine-containing monomers recited above and their respective polymers are well known in the art and, accordingly, their uses are also well established. Polyvinylidene fluoride, for example, can be used for wire and cable insulation, electronics/electrical components, irradiated shrinkable tubing, chemical process equipment components, aerospace components in contact with storable propellants, and as a long-life, durable finish for exterior siding.

The present invention is more particularly described in the following examples which are intended as illustrative only since numerous modifications and variations therein will be apparent to those skilled in the art.

EXAMPLE I

Into a three-neck, round-bottomed, 1000 milliliter baffled flask, equipped with thermometer and stirrer were added 33 grams (0.33 mole) of 90 percent tertiary butyl hydroperoxide and 15 milliliters of 30 percent potassium hydroxide solution. The mixture was stirred and cooled with an ice-water bath to 3° C. Fifty (50) milliliters of diethyl ether were then added to the flask. Thereafter, 44 grams (1.0 mole) of ethylene oxide were slowly added to the reaction flask. The temperature of the flask was maintained below 5° C. during the ethylene oxide addition. After all of the ethylene oxide had been added, the flask was stirred for an additional hour while maintaining the temperature at about 3° C. Cooling was then discontinued and the reaction mixture allowed to come to room temperature and thereafter stirred for 16 hours. The golden yellow ether phase was separated from the amber colored aqueous phase and the ether phase stirred with sodium sulfate until the cloudiness present disappeared. Thereafter, the sodium sulfate was filtered off and the ether solution transferred to a 500 milliliter round-bottomed flask and placed on a rotary film evaporator for six hours at 20 milliliters mercury and 24° C.

The stripped solution was distilled at one millimeter mercury and a main fraction product was collected at between 29° C. and 31.5° C. GLC analysis of the main fraction showed it to be 99.4 percent pure. The beta-hydroxyethyl tertiary butyl hydroperoxide structure was verified by nuclear magnetic resonance spectrum and infra-red analyses.

EXAMPLE II

The procedure of Example I was repeated except that propylene oxide was substituted for the ethylene oxide in Example I. Beta-hydroxypropyl tertiary butyl peroxide was recovered in about a 40 percent yield, based on tertiary butyl hydroperoxide. The beta-hydroxypropyl tertiary butyl peroxide structure was verified by infra-red spectrum and nuclear magnetic resonance spectrum analyses.

EXAMPLE III

The process of Example I was repeated except that isobutylene oxide was substituted for the ethylene oxide in Example I. Beta-hydroxyisobutyl tertiary butyl peroxide was obtained, the structure of which was verified by nuclear magnetic resonance spectrum and infra-red spectrum analyses.

EXAMPLE IV

Into a 38-gallon stainless steel autoclave equipped with an agitator were charged 20 gallons of deionized water. Agitation was commenced and the water heated to 140° F. A vacuum was then applied to the autoclave and gaseous vinylidene fluoride monomer charged to the reactor. Thereafter, 36 grams of beta-hydroxyethyl tertiary butyl peroxide and 50 grams of ammonium perfluorooctanoate were introduced into the autoclave. The temperature of the autoclave was then raised to 230° F. Pressure in the autoclave was maintained at about 1000 p.s.i.g. by introduction of additional gaseous vinylidene fluoride monomer. After 21 hours of pressurized operation, the run was terminated. Polyvinylidene fluoride having a plasticity measurement of 2180 mm.$^2$ and an average particle size of 0.31 micron was recovered. Paint panels prepared with this product were evaluated for such properties as: cross-hatch adhesion, pencil hardness, OT bend, 30 pound impact, resistance to hot water, gloss, general appearance and brightness; and, the panels found to be acceptable.

EXAMPLE V

The procedure of Example IV was repeated except that the temperature of the autoclave was about 225° F., and the autoclave pressure was about 900 p.s.i.g. After 22 hours of pressurized operation, polyvinylidene fluoride having a plasticity measurement of 2540 mm.$^2$ and an average particle size of about 0.28 micron was recovered. Paint panels prepared with this product were tested in the same manner as described in Example I and found to be acceptable.

EXAMPLE VI

A suitable two-gallon autoclave equipped with an agitator was charged with about 6 liters of water, 4.0 grams of beta-hydroxyethyl tertiary butyl peroxide and 4.0 grams of ammonium perfluorooctanoate. The autoclave was closed and agitation of the contents begun. The autoclave was then purged three times with nitrogen. After the nitrogen purge, the pressure was released and the autoclave heated to 110° C. Vinylidene fluoride monomer was then introduced into the autoclave until a pressure of 1000 p.s.i.g. was reached. When enough monomer was consumed so that the pressure in the autoclave was reduced to 900 p.s.i.g., additional vinylidene fluoride monomer was introduced into the autoclave until the pressure again reached 1000 p.s.i.g. This procedure was repeated until the polymerization was terminated at the end of about 1½ hours by turning off the heat and agitation. After the contents of the autoclave had cooled and the pressure released, the contents of the autoclave were removed through a bottom port of the autoclave. The product so removed was passed through a 100 mesh Monel screen to separate dispersed from non-dispersed product. The dispersed product (latex) was coagulated, filtered, washed on the filter with distilled water and then with methanol and dried in a vacuum oven at about 80° C. The dried product (about 958 grams) was micropulverized and then micronized at a feed pressure of about 90 p.s.i. and a back pressure of about 40 p.s.i.

The polyvinylidene fluoride thus produced had an acceptable Gardner-Holdt viscosity and plasticity measurement and an average particle diameter of about 0.40 micron. Paint panels prepared with this product were evaluated for such properties as: cross-hatch adhesion, pencil hardness, OT bend, 30 pound impact, resistance to hot water, gloss, general appearance and brightness; and, the panels were found to be acceptable.

EXAMPLE VII

The procedure of Example VI was repeated except that 4.0 grams of beta-hydroxypropyl tertiary butyl hydroperoxide were used as the initiator in place of beta-hydroxyethyl tertiary butyl peroxide. The polyvinylidene fluoride product recovered had a lower molecular weight and higher gloss in the paint panel than the polyvinylidene product obtained in Example VI, but was otherwise similar to the product of Example VI in all other porperties.

EXAMPLE VIII

The procedure of Example VI was repeated except that beta-hydroxyisobutyl tertiary butyl peroxide was substituted for the beta-hydroxyethyl tertiary butyl peroxide. The polyvinylidene fluoride product recovered was similar to the product obtained in Example VI, but the polymerization rate was about ⅓ that of the polymerization rate in Example VI.

EXAMPLE IX

In a manner similar to Example IV, vinyl fluoride is polymerized with beta-hydroxyethyl tertiary butyl peroxide. The temperature and pressure of the polymerization are about 95° C. and about 4000 p.s.i. respectively. Finely-divided particulate polyvinyl fluoride is recovered.

EXAMPLE X

In a manner similar to Example IV, chlorotrifluoroethylene is batch polymerized with beta-hydroxyethyl tertiary butyl peroxide at about 10° C. and a homopolymer of chlorotrifluoroethylene is recovered.

The particle size of polyvinylidene fluoride prepared in the previous examples was determined by measurement of the particles on an electron microscope photograph generally enlarged to 50,000 magnification.

The plasticity measurement of the polyvinylidene fluoride prepared in the above examples was performed in accordance with the procedure defined in U.S. Pat. 3,193,539. Briefly, that method comprises placing about 0.5 grams of polyvinylidene fluoride in a cone between sheets of aluminum foil which is then placed between the platens of a Carver press heated at 225° C. The platens are brought together to compress the powder under slight pressure (usually less than 50 p.s.i.) and the powder is preheated in this manner for 30 seconds. A pressure of 2500 p.s.i. (hydraulic pressure on the ram which is 2.031 inches) is then applied for 60 seconds. The area of the pressed plastic disc is measured with a planimeter and reported in square millimeters. The area of this disc is the plasticity measurement for the polymer and is inversely related to its molecular weight.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof

I claim:
1. In a process for polymerizing vinylidene fluoride, the improvement which comprises conducting the polymerization in the presence of an initiating amount of beta-hydroxyalkyl tertiary butyl peroxide having the general formula:

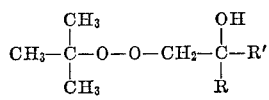

wherein R is selected from the group consisting of hydrogen and methyl, and R' is selected from the group consisting of hydrogen, methyl and ethyl.

2. The process of claim 1 wherein the polymerization is conducted in an aqueous medium at temperatures between 50° C. and 130° C.

3. The process of claim 1 wherein said peroxide initiator is selected from the group consisting of beta-hydroxyethyl tertiary butyl peroxide, beta-hydroxypropyl tertiary butyl peroxide, and beta-hydroxyisobutyl tertiary butyl peroxide.

4. The process of claim 1 wherein between about 0.02 and about 1.0 weight percent of beta-hydroxyalkyl tertiary butyl peroxide is used.

5. In a process for polymerizing vinylidene fluoride in an aqueous medium at temperatures of from about 50° C. to about 130° C., the improvement which comprises conducting the polymerization with an initiating amount of a member selected from the group consisting of beta-hydroxyethyl tertiary butyl peroxide, beta-hydroxypropyl tertiary butyl peroxide, and beta-hydroxyisobutyl tertiary butyl peroxide.

References Cited
UNITED STATES PATENTS

| | | | |
|---|---|---|---|
| 2,700,662 | 1/1955 | Young et al. | 260—92.1 |
| 2,795,618 | 6/1957 | Emerson et al. | 260—610 |
| 3,129,207 | 4/1964 | James | 260—92.1 |
| 3,193,539 | 7/1965 | Hauptschein | 260—92.1 |

HARRY WONG, JR., Primary Examiner

U.S. Cl. X.R.

117—121, 127, 128.4; 260—29.6, 87.5, 87.7, 610